United States Patent
Polaganga et al.

(10) Patent No.: US 11,626,915 B1
(45) Date of Patent: Apr. 11, 2023

(54) DYNAMIC BEAM PATTERN MANAGEMENT OF ONE OR MORE ANTENNA ELEMENTS OF AN ANTENNA ARRAY

(71) Applicant: T-Mobile Innovations LLC, Overland Park, KS (US)

(72) Inventors: Roopesh Kumar Polaganga, Bothell, WA (US); Deepak Nadh Tamanna, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/483,327

(22) Filed: Sep. 23, 2021

(51) Int. Cl.
*H04B 7/02* (2018.01)
*H04B 7/06* (2006.01)

(52) U.S. Cl.
CPC ......... *H04B 7/0639* (2013.01); *H04B 7/0695* (2013.01)

(58) Field of Classification Search
CPC ............................ H04B 7/0639; H04B 7/0695
USPC ........ 375/262, 261, 260, 259, 219, 316, 295
See application file for complete search history.

(56) References Cited

U.S. PATENT DOCUMENTS

| | | | |
|---|---|---|---|
| 2019/0379439 A1* | 12/2019 | Bolin | H04B 7/0617 |
| 2020/0154285 A1* | 5/2020 | Sturgeon | H04W 16/18 |
| 2020/0395790 A1* | 12/2020 | Vilenskiy | H01Q 9/04 |
| 2021/0116490 A1* | 4/2021 | Tanaka | G01R 29/10 |

\* cited by examiner

*Primary Examiner* — Zewdu A Kassa
(74) *Attorney, Agent, or Firm* — Shook, Hardy & Bacon L.L.P.

(57) ABSTRACT

Methods and systems are provided for dynamic beam pattern management of one or more antenna elements of an antenna array at a cell site. The methods can include receiving information associated with one or more user devices, where the information includes elevation information, and determining whether the user devices are positioned at an increased elevation, a decreased elevation, or an equal elevation relative to a threshold elevation value. The methods can also include shifting between broadcast footprints, where the broadcast footprints are different in at least a vertical plane or in at least an azimuthal plane.

20 Claims, 7 Drawing Sheets

US 11,626,915 B1

DYNAMIC BEAM PATTERN MANAGEMENT OF ONE OR MORE ANTENNA ELEMENTS OF AN ANTENNA ARRAY

SUMMARY

The present disclosure is directed, in part, to the dynamic beam pattern management of one or more antenna elements of an antenna array, substantially as shown in and/or described in connection with at least one of the figures, and as set forth more completely in the claims.

In aspects set forth herein, one or more antenna elements of an antenna array may shift between a first broadcast footprint and a second broadcast footprint, based at least partly on information associated with the one or more devices, including elevation information associated with the one or more devices.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
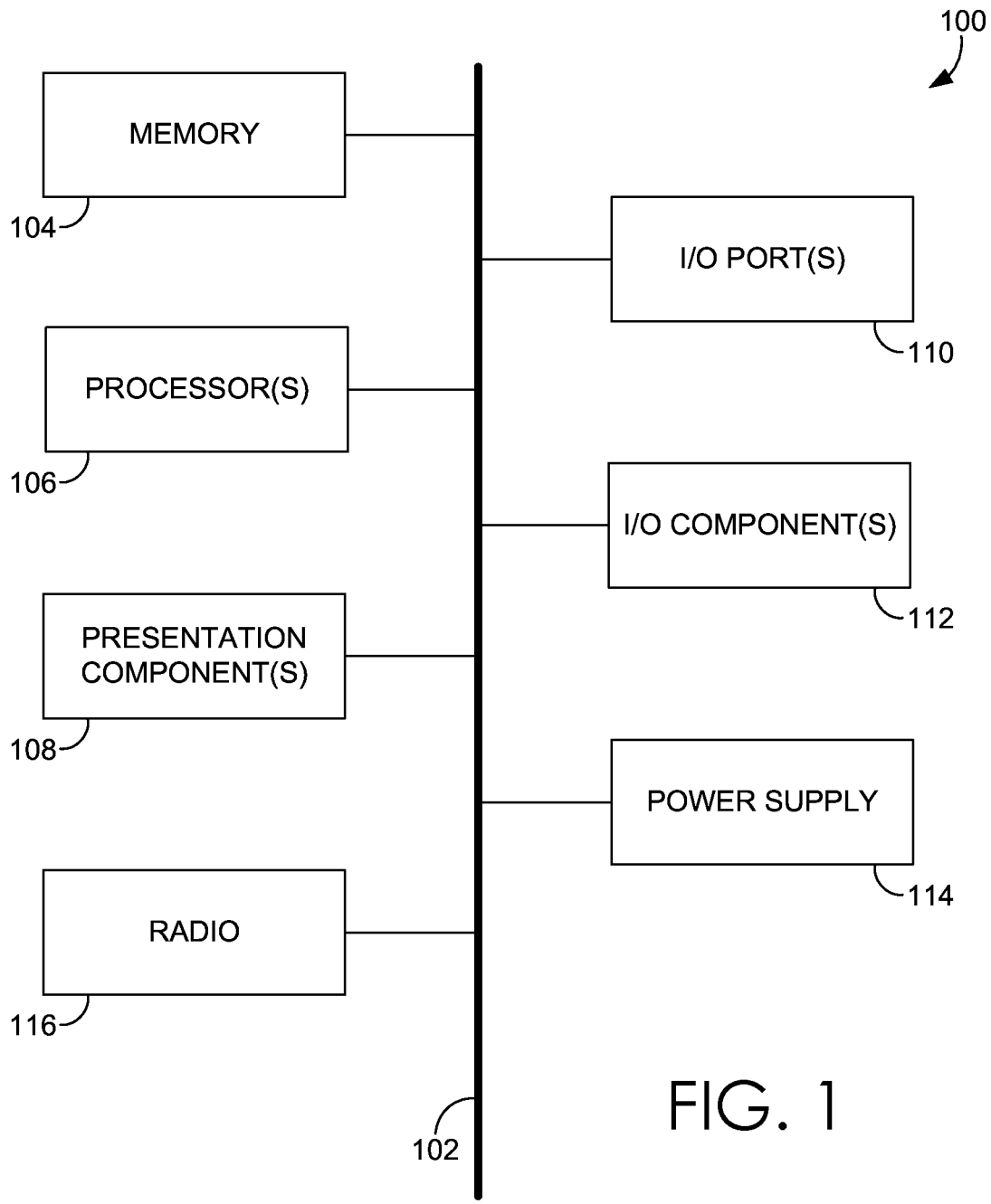
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
gNodeB Next Generation Node B
GIS Geographic/Geographical/Geospatial Information System
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MD Mobile Device
NR New Radio
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
UMTS Universal Mobile Telecommunications Systems Further, various technical terms are used throughout this description. An illustrative resource that fleshes out various aspects of these terms can be found in Newton's Telecom Dictionary, $31^{st}$ Edition (2018).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, certain conventional telecommunications networks provide network coverage utilizing static beam patterns to provide network access to user devices. For instance, certain conventional telecommunications networks may utilize a static horizontal beam pattern or a static vertical beam pattern depending upon the terrain or location of user devices serviced by a particular base station. In one conventional system, a static vertical beam pattern may be utilized to provide network coverage to one or more buildings. In such a system, the static vertical beam pattern may result in poor or non-existent network coverage to the areas surrounding the one or more buildings. In other conventional systems, a static horizontal beam pattern may be utilized by a particular base station in order to provide as broad, in a horizontal plane, of network coverage as possible. However, in such a system, the static horizontal beam pattern may result in poor or non-existent network coverage at higher elevations, e.g., in a building. While certain other conventional systems may rely on nano-, or pico-cell deployment to supplement coverage in certain areas, such a deployment may require interior access to buildings, which can be resource intensive in areas with a high density of tall buildings.

The systems and methods disclosed herein can alleviate one or more problems of the conventional systems described above. For example, in aspects, the systems disclosed herein can dynamically manage beam patterns of one or more antenna elements of an antenna array. In one example aspect, the systems and methods disclosed herein can dynamically shift between broadcast footprints based on the elevation position of at least a portion of user devices. Such methods and systems can provide dynamic network coverage for user devices no matter the elevation of the user devices, which can provide increased network access to user devices and/or increased user experience.

Accordingly, in one aspect, a method for dynamic beam pattern management of one or more antenna elements of an antenna array at a cell site is provided. The method can include receiving information associated with one or more devices over a first time interval, the information comprising elevation information. The method can also include determining, based on the information associated with the one or more devices, whether at least a portion of the one or more devices are positioned at an increased elevation, a decreased elevation, or an equal elevation relative to a threshold elevation value. Further, the method can include based on the determining, shifting between a first broadcast footprint of the one or more antenna elements of the antenna array and a second broadcast footprint of the one or more antenna elements of the antenna array, where the first and second broadcast footprints are different in an azimuthal plane and in a vertical plane.

In another aspect, a system for dynamic beam pattern management of one or more antenna elements of an antenna array at a cell site is provided. The system can include an antenna array comprising one or more antenna elements, and a processor. The processor can be configured to execute operations that include receiving information associated with one or more devices over a first time interval, the information comprising elevation information. The processor can also be configured to execute operations that include determining, based on the information associated with the one or more devices, whether at least a portion of the one or more devices are positioned at an increased elevation, a decreased elevation, or an equal elevation relative to a threshold elevation value. The processor can also be configured to execute operations that include, based on the determining, shifting between a first broadcast footprint of the one or more antenna elements of the antenna array and a second broadcast footprint of the one or more antenna elements of the antenna array, where the first and second broadcast footprints are different in an azimuthal plane and in a vertical plane.

As used herein, user equipment (UE) (also referenced herein as a user device) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 100 described herein with respect to FIG. 1.

Referring to FIG. 1, a diagram is depicted of an example computing environment suitable for use in implementations of the present disclosure. In particular, the example computing environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, the computing device 100 includes a bus 102 that directly or indirectly couples the following devices: memory 104, one or more processors 106, one or more presentation components 108, input/output (I/O) ports 110, I/O components 112, and a power supply 114. The bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of the I/O components 112. Also, processors, such as one or more processors 106, have memory. The present disclosure recognizes that such is the nature of the art, and reiterates that FIG. 1 is merely illustrative of an example computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

The computing device 100 typically includes a variety of computer-readable media. Computer-readable media can be any available media that can be accessed by the computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 104 includes computer-storage media in the form of volatile and/or nonvolatile memory. The memory 104 may be removable, nonremovable, or a combination thereof. Exemplary memory includes solid-state memory, hard drives, optical-disc drives, etc. The computing device 100 includes one or more processors 106 that read data from various entities such as bus 102, the memory 104 or the I/O components 112. One or more presentation components 108 presents data indications to a person or other device. Exemplary one or more presentation components 108 include a display device, speaker, printing component, vibrating component, etc. The I/O ports 110 allow the computing device 100 to be logically coupled to other devices including the I/O components 112, some of which may be built in the computing device 100. Illustrative I/O components 112 include a microphone, joystick, game pad, satellite dish, scanner, printer, wireless device, etc.

The radio 116 represents a radio that facilitates communication with a wireless telecommunications network. Illustrative wireless telecommunications technologies include CDMA, GPRS, TDMA, GSM, and the like. The radio 116 might additionally or alternatively facilitate other types of wireless communications including Wi-Fi, WiMAX, LTE, or other VoIP communications. As can be appreciated, in various embodiments, the radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
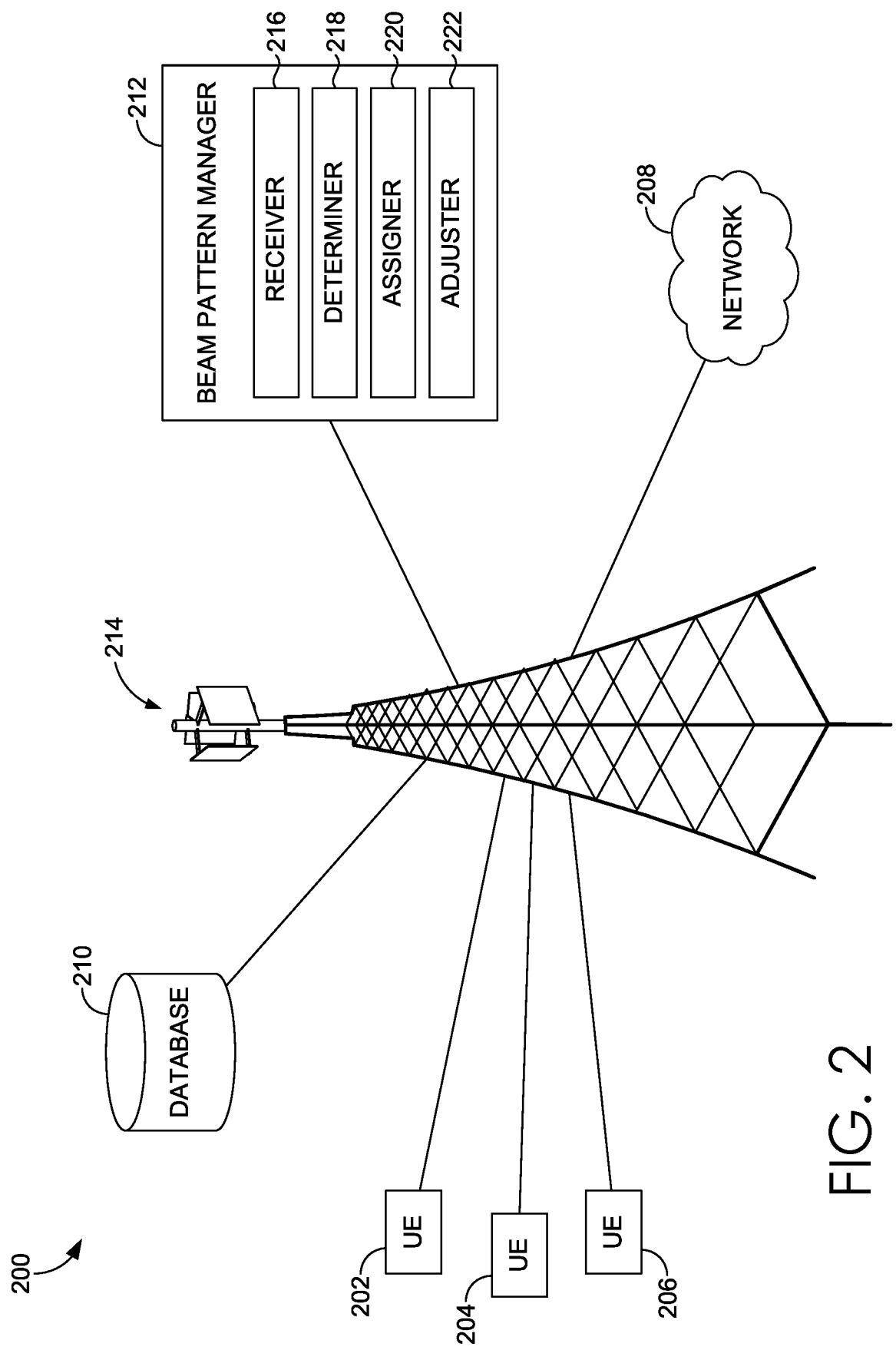
FIG. 2 illustrates a diagram of an exemplary network environment in which implementations of the present disclosure may be employed.

FIG. 2 depicts one example network environment in which implementations of the present disclosure may be employed. The example network environment of FIG. 2 is illustrated and designated generally as network environment 200. It should be understood that the network environment 200 is but one example of a suitable network environment and is not intended to suggest any limitation as to the scope of use or functionality of the invention. It should also be understood that the network environment is not to be interpreted as having any dependency or requirement relating to any one or combination of components illustrated therein.

The network environment 200 depicted in FIG. 2 includes user devices 202, 204, and 206, a cell site 214, a network 208, a database 210, and a beam pattern manager 212. In the network environment 200, the user devices 202, 204, and 206 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, or any combination thereof, or any other device that communicates via wireless communications with a cell site, e.g., the cell site 214, in order to interact with a public or private network.

In some aspects, the user devices 202, 204, and 206 can correspond to the computing device 100 of FIG. 1. Thus, a user device can include, for example, a display(s), a power source(s) (e.g., a battery), a data store(s), a speaker(s), memory, a buffer(s), a radio(s) and the like. In some implementations, a user device, e.g., one or more of the user devices 202, 204, and 206, comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some aspects, the user devices 202, 204, and 206 in the network environment 200 can optionally utilize the network 208 to communicate with other computing devices (e.g., a mobile device(s), a server(s), a personal computer(s), etc.) through the cell site 214 using any one of a plurality of wireless communication protocols, such as 3G, 4G/LTE, 5G and other related protocols. In aspects, the network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. The network 208 can include multiple networks, as well as being a network of networks, but is shown in more simple form so as to not obscure other aspects of the present disclosure.

The network 208 can be part of a telecommunication network that connects subscribers to their immediate service provider. In some instances, the network 208 can be associated with a telecommunications provider that provides services (e.g., 5G and LTE) to user devices, such as the user devices 202, 204, and 206. For example, the network 208 may provide voice, SMS, and/or data services to user devices or corresponding users that are registered or subscribed to utilize the services provided by a telecommunications provider. The network 208 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some aspects, the cell site 214 can be configured to communicate with user devices, such as the user devices 202, 204, and 206 that are located within the geographical area, or cell, covered by radio antennas of the cell site 214. The cell site 214 may include one or more base stations, base transmitter stations, radios, antennas, antenna arrays, power amplifiers, transmitters/receivers, digital signal processors, control electronics, GPS equipment, and the like.

As shown in FIG. 2, the cell site 214 is in communication with the beam pattern manager 212, which comprises various components that are utilized, in various implementations, to perform one or more methods for dynamic beam pattern management of one or more antenna elements of an antenna array, such as an antenna array associated with the cell site 214. In aspects, the beam pattern manager 212 includes a receiver 216, a determiner 218, an assigner 220, and an adjuster 222. However, in other implementations, more or less components than those shown in FIG. 2 may be utilized to carry out aspects of the systems and methods described herein. Each of the components or sub components of the beam pattern manager 212 may be a stand-alone or combined processor, server, or other computer processing component that is suitably configured to perform the operations described herein.

In various aspects, the receiver 216 of the beam pattern manager 212 is generally responsible for receiving information associated with one or more user devices, e.g., the user devices 202, 204, and/or 206. In various aspects, the information associated with the one or more user devices can be any information that is relevant for dynamic beam pattern management of one or more antenna elements of an antenna array. In certain aspects, the information associated with the one or more devices can include elevation information for the one or more devices. In the same or alternative aspects, the information associated with the one or more devices can include other location information, such as latitude and longitude, GPS, and/or other equivalent information. In various aspects, the information associated with the one or more devices can include above mean sea level (AMSL) values. In certain aspects, the information associated with the one or more devices can include velocity information. In one or more aspects, the information associated with the one or more devices can include Minimization of Drive Test (MDT) information. In various aspects, the MDT information can include, but is not limited to, elevation and/or AMSL values, latitude values, longitude values, GPS information, velocity information, or a combination thereof.

In various aspects, the information associated with the one or more devices can be any of the information described herein when the one or more devices is in a connected state and/or in an idle mode. In certain aspects, a device in idle mode can log any of the information described herein and provide to the network and/or base station when connected. In various aspects, any of the information described herein can also include a time associated with such information, e.g., can be time-stamped. In various aspects, a network, base station, and/or operator may request any of the information associated with the one or more devices described herein at any time and/or at specific defined intervals, e.g., weekly, daily, every hour, every half-hour, or every fifteen minutes. In certain aspects, the information associated with one or more user devices can be information that was provided to the cell site 214 and/or base station at any time and logged or stored, e.g., in a database 210.

In aspects, the determiner 218 is responsible for determining whether at least a portion of one or more devices are positioned at an increased elevation, a decreased elevation, or an equal elevation relative to a threshold elevation value. In various aspects, the threshold elevation value can be any value designated by an operator and/or network. In various aspects, the threshold elevation value may be an AMSL value. In certain aspects, one or more components of the network environment, e.g., a base station associated with the cell site 214 and/or the beam pattern manager 212, can calculate a threshold elevation value based on elevation information associated with one or more devices over a specific time interval. For instance, a median threshold elevation value can be calculated based on elevation information associated with devices during a specific time interval. Additionally or alternatively, an average threshold elevation value can be calculated based on elevation information associated with devices during a specific time interval. In various aspects, a threshold elevation value can be associated with a median and/or average threshold elevation value. For instance, a threshold elevation value can be a percentage or fraction of a median and/or average threshold elevation value, such as 120% of a median threshold elevation value, or 80% of a median threshold elevation value. In certain aspects, the threshold elevation value can be based on and/or calculated from elevation or other information from one or more devices over a prior time period. For instance, the threshold elevation value can be calculated or based on elevation or other information from one or more devices over a week, month, or specific day, prior to the time with which the determiner 218 may be assessing the elevation position of one or more devices that are communicating with the cell site 214 or attempting to communicate with the cell site 214. Stated differently, in aspects, the threshold elevation value can be based on historical elevation or other information from user devices over any desired historical time interval.

In certain aspects, as discussed above, the determiner 218 determines whether at least a portion of one or more devices are positioned at an increased elevation, a decreased elevation, or an equal elevation relative to a threshold elevation value. In aspects, the one or more devices can be devices that are communication with or attempting to communicate with the cell site 214 during a specific time interval. For instance, the one or more devices can be devices that are communicating with or attempting to communicate with the cell site 214 currently or contemporaneously, or over the most recent prior hour, half-hour, quarter-hour, or other time interval.

In various aspects, the determiner 218 can compare the specific elevation of each device to the threshold elevation value to discern whether that device is positioned at an increased elevation, a decreased elevation, or an equal elevation relative to a threshold elevation value. In such aspects, the determiner 218 may also aggregate such comparisons to determine how many or what proportion of the devices are at an increased elevation, a decreased elevation, or an equal elevation relative to the threshold elevation value.

In certain aspects, the determiner 218 can determine that when any number of devices is above, below, or equal to the threshold elevation value that the cell site 214 should shift its broadcast footprint. Alternatively, the determiner 218 can determine that when a certain proportion of devices that are communicating, or attempting to communicate, with the cell site 214 over a time interval are above, below, or equal to the threshold elevation value that the cell site 214 should shift broadcast footprints. For instance, in one aspect, the determiner 218 can determine that when 10% or more, 20% or more, 30% or more, 40% or more, 50% or more, 60% or more, 70% or more, 80% or more, or 90% or more of devices that are communicating, or attempting to communicate, with the cell site 214 over a time interval are above, below, or equal to the threshold elevation value that the cell site 214 should shift broadcast footprints. In the same or alternative aspects, the determiner 218 can calculate a median or average elevation of the devices that are communicating, or attempting to communicate, with the cell site 214 over a time interval, and then determine if such a median or average is above or below the threshold elevation value to discern whether the cell site 214 should shift broadcast footprints.

In aspects, once the determiner 218 has determined that the cell site 214 should shift broadcast footprints, the assigner 220 is responsible for assigning a broadcast footprint for which the cell site 214 is to switch to. In aspects, the assigner 220 can assign any type of broadcast footprint for the cell site 214. In various aspects, the assigner 220 can assign a broadcast footprint that is pre-selected by the operator and/or network for use at the cell site 214. In certain aspects, the assigner 220 can assign a more vertically oriented broadcast footprint, e.g., when at least a portion of the one or more devices are positioned at an increased elevation, or substantially equal elevation, relative to a threshold elevation value. In various aspects, the assigner 220 can assign a more horizontally oriented broadcast footprint, e.g., when at least a portion of the one or more devices are positioned at a decreased elevation, or substantially equal elevation, relative to a threshold elevation value. Examples of horizontally oriented broadcast footprints are described below with reference to FIGS. 4A, 4B, and 6, while examples of vertically oriented broadcast footprints are described below with reference to FIGS. 5A, 5B, and 6.

In aspects, the adjuster 222 is responsible for facilitating the adjustment of a broadcast footprint based on the broadcast footprint assigned by the assigner 220. In one aspect, the adjuster can instruct, directly or through one or more other components associated with the cell site 214, a power source or amplifier associated with the antenna array, or antenna elements thereof, to adjust a power level in order to switch or adjust broadcast footprints.

Figure 3:
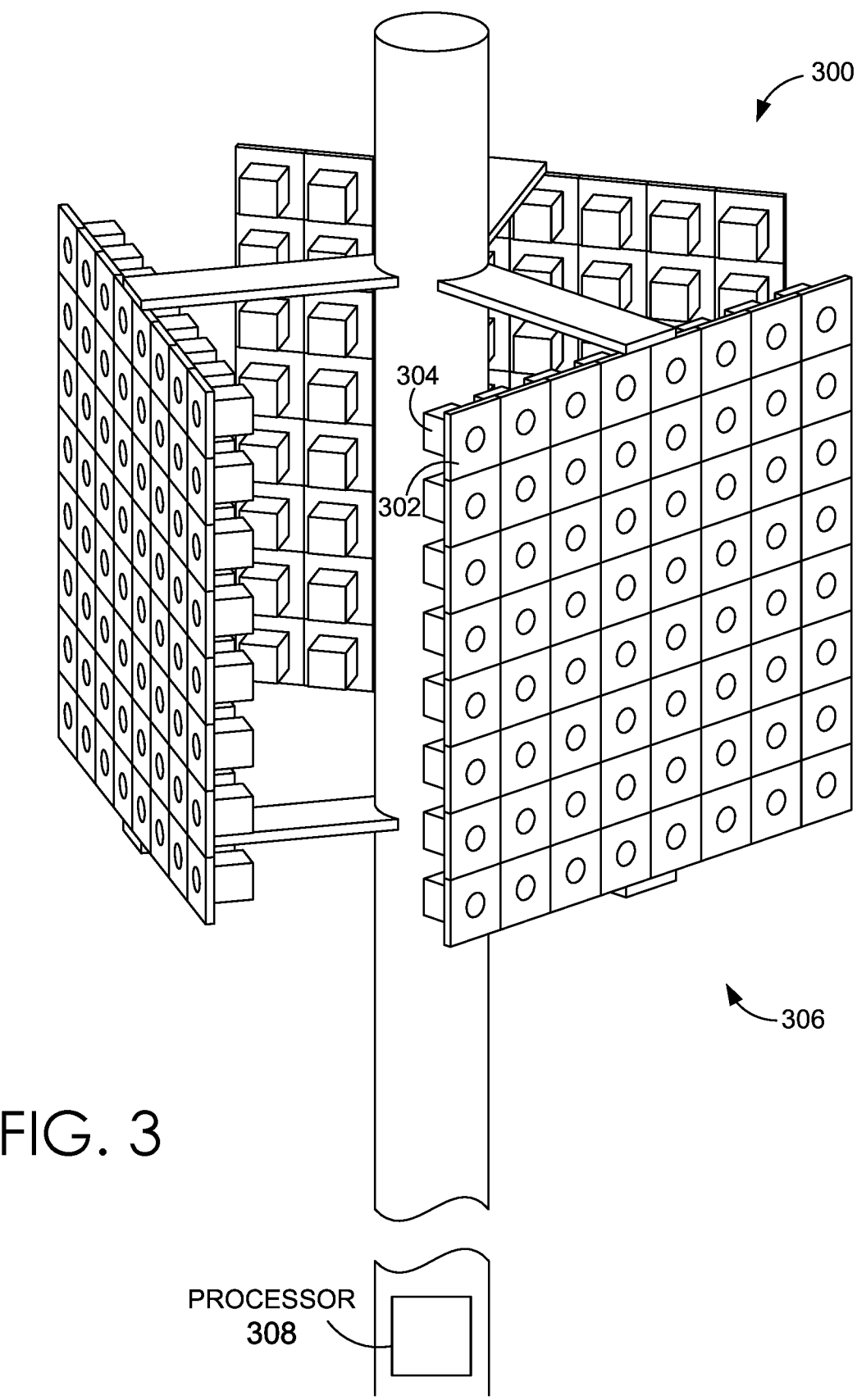
FIG. 3 depicts a schematic representation of a base station suitable for use in aspects of the present disclosure.

FIG. 3 depicts an example base station configuration suitable for use in implementing embodiments of the present disclosure and is designated generally as base station 300. Base station 300 is but one example of a suitable configuration and is not intended to suggest any limitations as to the scope of use or functionality of embodiments described herein. Neither should the configuration be interpreted as having any dependency or requirement relating to any one or combination of components illustrated.

The base station 300 comprises at least one antenna array 306, where the antenna array 306 includes one or more antenna elements 302. In aspects, the one or more antenna elements 302 may be dipole antennas, having a length, for example, of ¼, ½, 1, or 1½ wavelength. In aspects, the antenna array 306 may be an active antenna array, FD-MIMO, massive MIMO, 3G, 4G, 5G, and/or 802.11. While we refer to dipole antennas herein, in other aspects, the antenna may be monopole, loop, parabolic, traveling-wave, aperture, yagi-uda, conical spiral, helical, conical, radomes, horn, and/or apertures, or any combination thereof. It is noted that adjusting one or more individual power supplies to antennas of an antenna array may be broadly applicable to an antenna array comprising any type of antenna targeting any portion of the RF spectrum (though any lower than VHF may be size prohibitive). In one aspect, the antenna may be configured to communicate in the UHF and/or SHF spectrum, for example, in the range of 1.3 GHz-30 GHz.

In the aspect depicted in FIG. 3, each antenna element 302 of the antenna array 306 comprises a dedicated power supply 304. The power supply 304 supplies power having a certain phase and amplitude to a respective antenna element 302. In an aspect, the power supply 304 comprises a power amplifier. In various aspects, the power supply, e.g., the power supply 304, may additionally comprise a processor for controlling or adjusting the power supply to the respective antenna element 302, e.g., as discussed above with reference to the beam pattern manager 212 of FIG. 2. In aspects, each power supply 304 may have a maximum power to supply to its respective antenna element 302. In aspects, the maximum per-antenna supply power may be 2.5 W, 3.5 W, 4 W, 5 W, or more.

In aspects, the base station 300 may further comprise a processor 308. In such aspects, the processor 308 may be any one or more processors, servers, computer processing components, or the like, that can be configured to perform any one or more operations of the beam pattern manager 212 of FIG. 2. In some aspects, the processor 308 may be communicatively coupled to each antenna element 302 of the antenna array 306. In aspects, as discussed above with respect to the beam pattern manager 212 of FIG. 2, the processor 308 of FIG. 3 may execute all or a part of the actions for the dynamic beam pattern management of one or more antenna elements of an antenna array at a cell site.

Figures 4A, 4B:
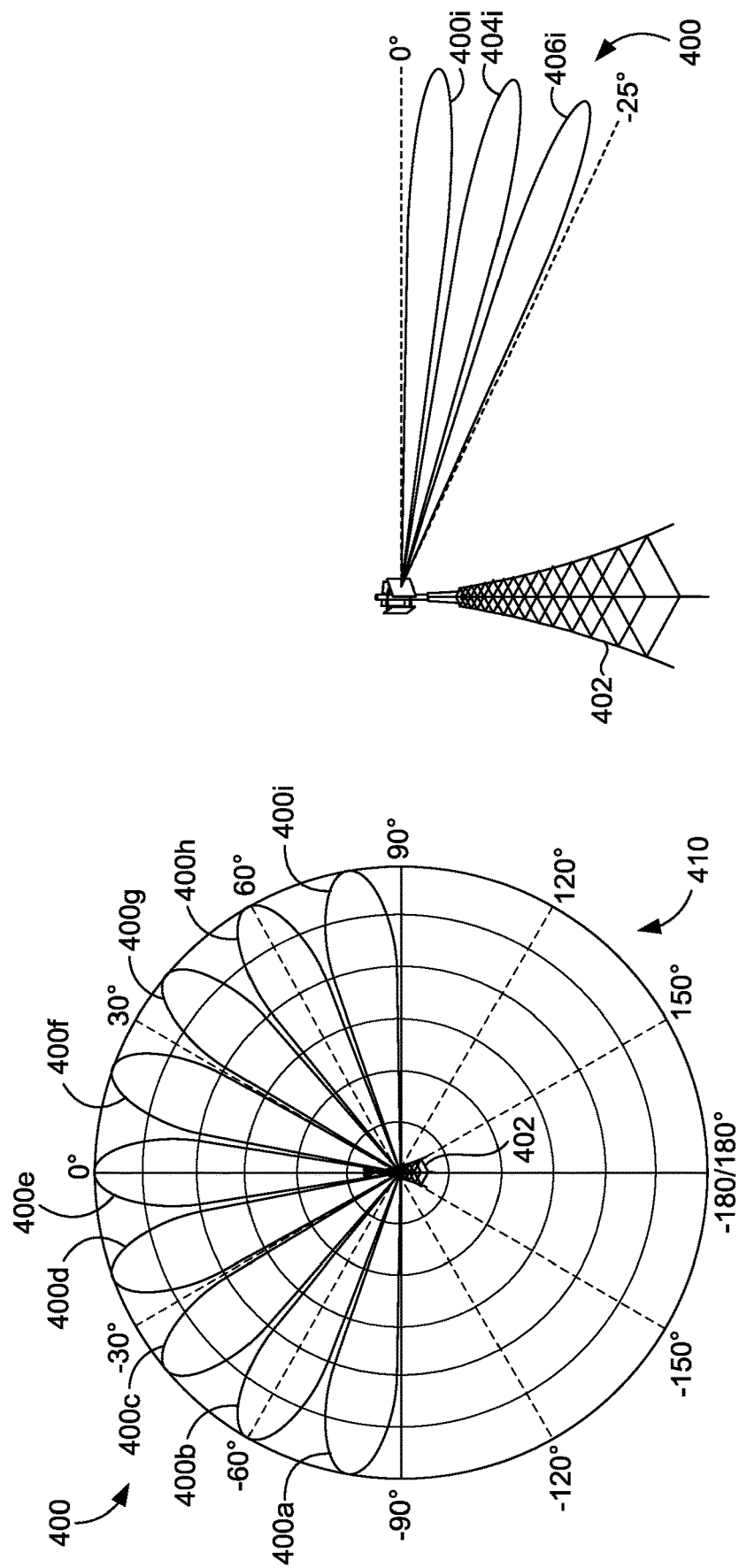
FIG. 4A depicts a schematic representation of a broadcast footprint in an azimuthal plane, in accordance with aspects herein.
FIG. 4B depicts a schematic representation of the broadcast footprint of FIG. 4A in a vertical plane, in accordance with aspects herein.

As discussed above, in certain aspects, a cell site or base station, e.g., via a beam pattern manager, may determine that the broadcast footprint for one or more antenna elements should be changed or tailored to better reflect the elevation or other position of the devices in communication with the cell site. For instance, as discussed above, in certain instances a horizontally oriented broadcast pattern may be desired. FIGS. 4A and 4B depict an example broadcast footprint that may be considered as horizontally oriented. As best seen in FIG. 4A, a broadcast footprint 400 is schematically depicted as plotted on a polar coordinate system 410. At the center of the polar coordinate system 410 is a schematically depicted cell site 402, which in this example is the source of the broadcast footprint 400. In this example aspect of FIG. 4A, the cell site 402, and/or an antenna array, is pointed at 0° on the polar coordinate system 410. In this example, the polar coordinate system 410 is also intended to depict the X and Y direction of the broadcast footprint 400 and also may be considered a azimuthal plane. For instance, the polar coordinate system 410 depicts an X-axis extending from −90° through the cell site 402 and to 90°, while the Y-axis extends from 0° through the cell site 402 and to 180°/−180°. In aspects, the X and Y directions of the broadcast footprint depict the broadcast footprint on the ground.

As can be seen in FIG. 4A, the broadcast footprint 400 includes a plurality of beams, e.g., beams 400a-400i. In the aspect depicted in FIG. 4A, the plurality of beams extend from about 90° to about −90° in the X and Y direction and/or in the azimuthal plane. Stated differently, the broadcast footprint in the azimuthal plane, e.g., X and Y direction, extends at an angle of about 180° when plotted on a polar coordinate system. It should be understood that the X and Y coverage of the broadcast footprint 400 of FIG. 4A is just one example and that other sizes of horizontal coverage areas are contemplated by the present disclosure. It should also be understood that the broadcast footprint 400 and plurality of beams are just schematically depicted and do not necessarily reflect the actual size, and/or shape of the beams produced by an antenna array. Further, while nine beams are depicted in FIG. 4A, it should be understood that any number of beams may be provided and that nine beams are provided as just an example. For instance, in one aspect, a broadcast footprint may include 6 beams, 12 beams, 15 beams, 16 beams, 18 beams, or 20 beams spaced apart in a horizontal direction. In aspects, the number of beams in a horizontal direction and/or vertical direction can be associated with a particular design of an individual antenna array.

Turning now to FIG. 4B, the broadcast footprint 400 is depicted from a side-view, showing the vertical profile of a broadcast footprint, e.g., in the Z direction and/or in a vertical plane. In aspects, the Z direction and/or the vertical plane is positioned at a right angle to the X direction and the Y direction as depicted and described with reference to FIG. 4A. In FIG. 4B, the 0° designation marks the vertical position of the antenna array of the cell site 402 that provides the broadcast footprint 400. As can be seen in FIG. 4B, the broadcast footprint 400 includes three layers of beams vertically spaced apart from one another, with beams 400i, 404i, and 406i being visible in FIG. 4B. These three layers of beams extend in the vertical or Z direction from about 0° to about −25°. It should be understood that the vertical extent of the broadcast footprint 400 in FIG. 4B is just one example and that other vertical beam arrangements are contemplated by the present disclosure.

In aspects, each of the three layers of vertically spaced apart beams can include a plurality of beams. For example, each layer of the three layers of beams depicted in FIG. 4B can include any number of horizontally spaced apart beams, such as the numbers of beams discussed above with reference to FIG. 4A. In one aspect, the broadcast pattern can include a first vertical layer of beams that includes 15 or 16 beams, a second vertical layer of beams that includes 15 or 16 beams, and a third vertical layer that includes 1-5 beams.

In various aspects, as discussed above, the broadcast footprint 400 of FIGS. 4A and 4B can be considered a horizontally oriented broadcast footprint. For instance, the broadcast footprint 400 includes a wider spread of beams in the horizontal direction, e.g., −90° to 90° on a polar coordinate system, then compared to the vertical direction, e.g., 0° to −25° in the Z direction or vertical direction. In aspects, a horizontally oriented broadcast footprint may be utilized when an operator or cell site is attempting to cover as broad an area of the site surface as possible. In certain aspects, a horizontally oriented broadcast footprint, e.g., the broadcast footprint 400 of FIGS. 4A and 4B, is a default setting for a cell site or antenna array. In certain conventional deployments, cell sites and/or antenna arrays may be statically positioned or programmed to provide a static horizontally oriented broadcast footprint.

Figure 5B:
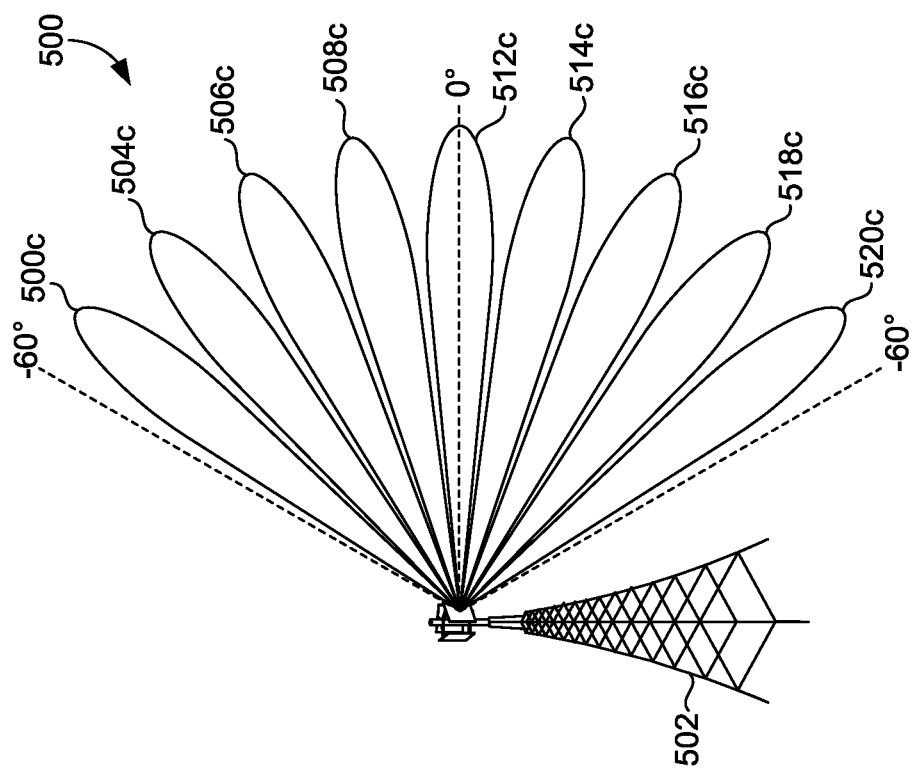
FIG. 5B depicts a schematic representation of the broadcast footprint of FIG. 5A in a vertical plane, in accordance with aspects herein.
Figure 5A:
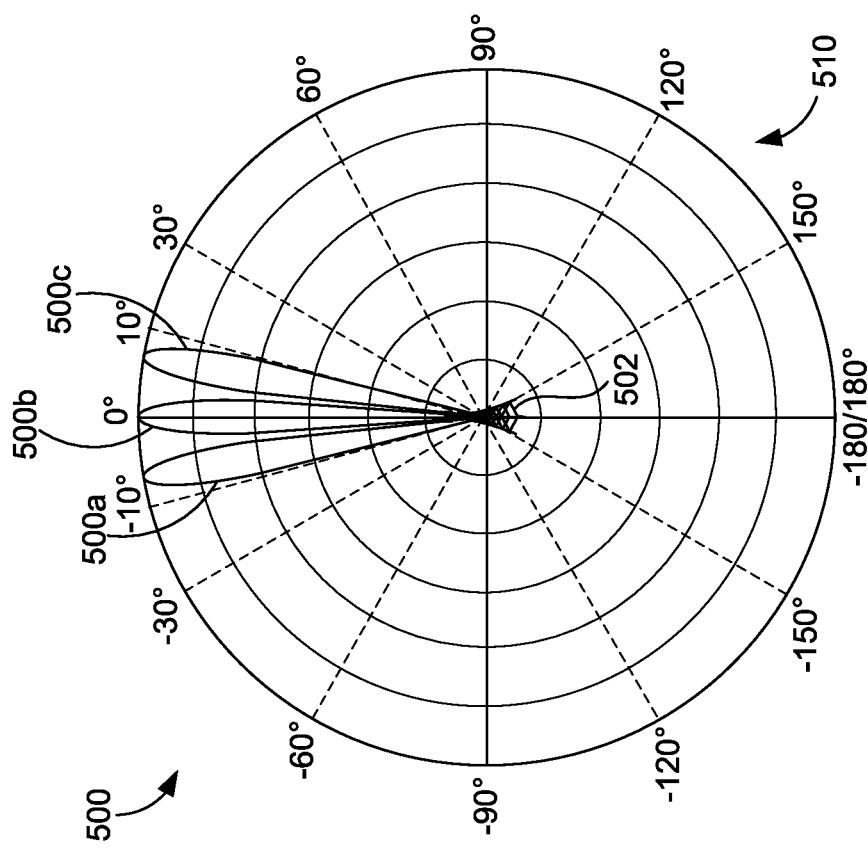
FIG. 5A depicts a schematic representation of another broadcast footprint in an azimuthal plane, in accordance with aspects herein.

FIGS. 5A and 5B schematically depict a broadcast footprint 500 having a different arrangement of individual beams and layers of beams as compared to the broadcast footprint 400 of FIGS. 4A and 4B. Like FIG. 4A, in FIG. 5A, a broadcast footprint 500 is schematically depicted as plotted on a polar coordinate system 510. At the center of the polar coordinate system 510 is a schematically depicted cell site 502, which in this example is the source of the broadcast footprint 500. In this example aspect of FIG. 5A, the cell site 502, and/or an antenna array, is pointed at 0° on the polar coordinate system 510. In this example, the polar coordinate system 510 is also intended to depict the X and Y direction of the broadcast footprint 500, and also may be considered a azimuthal plane. For instance, the polar coordinate system 510 depicts an X-axis extending from −90° through the cell site 502 and to 90°, while the Y-axis extends from 0° through the cell site 502 and to 180°/−180°. In aspects, the X- and Y directions of the broadcast footprint depict the broadcast footprint on the ground.

As can be seen in FIG. 5A, the broadcast footprint 500 includes a plurality of beams, e.g., beams 500a-500c. In the aspect depicted in FIG. 5A, the plurality of beams extend from about −10° to about 10°. Stated differently, the broadcast footprint in the azimuthal plane, e.g., X and Y direction, extends at an angle of about 20° when plotted on a polar coordinate system. It should be understood that the X and Y coverage of the broadcast footprint 500 of FIG. 5A is just one example and that other sizes of horizontal coverage areas are contemplated by the present disclosure. It should also be understood that the broadcast footprint 500 and plurality of beams are just schematically depicted and do not necessarily reflect the actual size, and/or shape of the beams produced by an antenna array. Further, while three beams are depicted in FIG. 5A, it should be understood that any number of beams may be provided and that three beams are provided as just an example. For instance, in one aspect, a broadcast footprint may include one beam, two beams, four beams, five beams, six beams, or 10 beams spaced apart in a horizontal direction. In aspects, the number of beams in a horizontal direction and/or vertical direction can be associated with a particular design of an individual antenna array.

Turning now to FIG. 5B, like in FIG. 4B, the broadcast footprint 500 is depicted from a side-view, showing the broadcast footprint in the Z direction and/or in a vertical plane. In aspects, the Z direction and/or the vertical plane is positioned at a right angle to the X direction and the Y direction as depicted and described with reference to FIG. 5A. In FIG. 5B, the 0° designation marks the vertical position of the antenna array of the cell site 502 that provides the broadcast footprint 500. As can be seen in FIG. 5B, the broadcast footprint 500 includes nine layers of beams vertically spaced apart from one another, e.g., beams 500c, 504c, 506c, 508c, 512c, 514c, 516c, 518c, and 520c. These nine layers of beams extend in the vertical or Z direction from about 60° to about −60°. It should be understood that the vertical extent of the broadcast footprint 500 in FIG. 5B is just one example and that other vertical beam arrangements are contemplated by the present disclosure. For instance, in other non-limiting example aspects, the broadcast footprint 500 could include six vertically spaced apart layers of beams, eight vertically spaced apart layers of beams, 10 vertically spaced apart layers of beams, 11 vertically spaced apart layers of beams, or 12 vertically spaced apart layers of beams.

In aspects, each of the nine layers of beams can include a plurality of beams. For example, each layer of the nine layers of beams depicted in FIG. 5B can include any number of horizontally spaced apart beams, such as the numbers of beams discussed above with reference to FIG. 5A. In one aspect, the broadcast footprint 500 can include nine vertical layers, with 1-5 beams in each vertical layer. In one aspect, the broadcast footprint 500 can include 10 or 11 vertical layers of beams, where each vertical layer includes 3 horizontally spaced apart beams for 32 or 33 total beams.

In various aspects, as discussed above, the broadcast footprint 500 of FIGS. 5A and 5B can be considered a vertically oriented broadcast footprint. For instance, the broadcast footprint 500 includes a narrow horizontal spread of beams in the horizontal direction, e.g., −10° to 10° on a polar coordinate system, compared to the vertical direction, e.g., 60° to −60° in the Z direction or vertical direction. In aspects, a vertically oriented broadcast footprint may be utilized when an operator or cell site is attempting to provide network access to devices located at increased elevations, e.g., elevations above a median AMSL threshold level and/or at increased elevations in buildings or other elevated natural or artificial structures. In certain conventional deployments, cell sites and/or antenna arrays may be statically positioned or programmed to provide a static vertically oriented broadcast footprint, e.g., to cover devices in one or more buildings.

In various aspects, as can be seen in comparing the broadcast footprint 400 of FIGS. 4A and 4B to the broadcast footprint of FIGS. 5A and 5B, the broadcast footprint 500 is reduced in an azimuthal plane, e.g., X and Y direction, relative to the broadcast footprint 400. In the same or alternative aspects, the broadcast footprint 500 has an increased footprint in a vertical plane, e.g., the Z direction, relative to the broadcast footprint 400. In various aspects, the broadcast footprint 400, in the azimuthal plane, e.g., X and Y direction, is larger relative to the broadcast footprint 500. In certain aspects, the broadcast footprint 400, in the vertical plane, e.g., the Z direction, is reduced relative to the broadcast footprint 500.

As discussed above, the systems and methods disclosed herein can provide dynamic beam pattern management of one or more antenna elements of an antenna array. For instance, in certain aspects, when one or more devices are above or equal to a specific threshold elevation value, the systems and methods disclosed herein can adjust a broadcast footprint and/or switch to another broadcast footprint that may provide better connectivity to the one or more devices. In such an aspect, the systems and methods disclosed herein may shift to a vertically oriented broadcast footprint, e.g., at least partly similar or substantially similar to the broadcast footprint 500 of FIGS. 5A and 5B. In the same or alternative aspects, as discussed above, when one or more devices are below or equal to a specific threshold elevation value, the systems and methods disclosed herein may adjust and/or shift to a horizontally oriented broadcast footprint, e.g., at least partly similar or substantially similar to the broadcast footprint 400 of FIGS. 4A and 4B.

Figure 6:
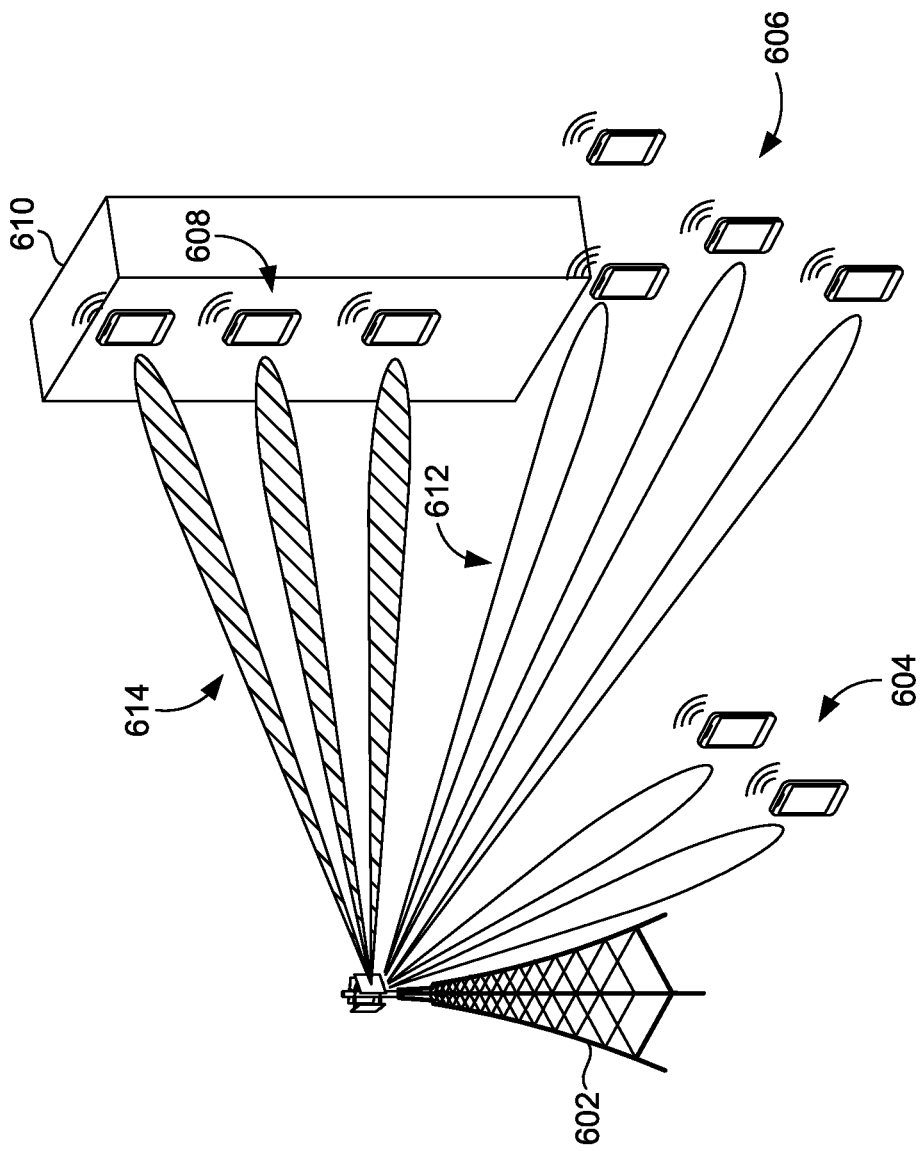
FIG. 6 depicts a schematic representation of a base station and first and second broadcast footprints, along with user devices, in accordance with aspects herein.

Turning now to FIG. 6, a system 600 is depicted, e.g., a telecommunications system, that includes a base station 602 for providing wireless communications to a plurality of devices. In the aspect depicted in FIG. 6, the base station 602, at a first time, is depicted as providing a broadcast footprint 612 or beam pattern to provide network connectivity to the groups of user devices 604 and 606. In the aspect depicted in FIG. 6, the broadcast footprint 612, at this first time, can be a horizontally oriented broadcast footprint, e.g., at least partly similar or substantially similar to the broadcast footprint 400 of FIGS. 4A and 4B. In such an aspect, as discussed above, a horizontally oriented broadcast footprint may exhibit an increased footprint in the azimuthal plane e.g., X and Y direction, compared to a vertically oriented broadcast footprint, e.g., a broadcast footprint at least partly or substantially similar to the broadcast footprint 500 of FIGS. 5A and 5B. Further, in such an aspect, a horizontally oriented broadcast footprint can provide connectivity to user devices over a broad area in an azimuthal plane, e.g., the X and Y directions, such as on a street.

In the aspect depicted in FIG. 6, at a second time, the base station 602 may provide a broadcast footprint 614 or beam pattern to provide network connectivity to a group of user devices 608 that are positioned within a building 610. In such an aspect, the broadcast footprint 614 can be a vertically oriented broadcast footprint, e.g., at least partly similar or substantially similar to the broadcast footprint 500 of FIGS. 5A and 5B. In such aspects, as discussed above, a vertically oriented broadcast footprint may exhibit a decreased footprint in the azimuthal plane e.g., X and Y direction, compared to a horizontally oriented broadcast footprint, e.g., a broadcast footprint at least partly or substantially similar to the broadcast footprint 400 of FIGS. 4A and 4B. However, in such aspects, as discussed above, a vertically oriented broadcast footprint, e.g., the broadcast footprint 614, can provide an increased footprint in a vertical plane or Z direction, compared to a horizontally oriented broadcast footprint, e.g., a broadcast footprint at least partly or substantially similar to the broadcast footprint 400 of FIGS. 4A and 4B.

As discussed above, the systems and methods disclosed herein can provide dynamic beam pattern management of an antenna array or base station. For instance, the systems and methods disclosed herein can dynamically shift broadcast footprints of one or more antenna elements of an antenna array when at least a portion of user devices are above, below, or at a threshold elevation value. In the system 600 depicted in FIG. 6, the broadcast footprint 612 can be provided at a first time, when the groups of user devices 604 and 606 are positioned outside the building, e.g., where such devices may be below or at a threshold elevation value. In the same or alternative aspects, the base station 602 and/or one or more antenna elements of an associated antenna array may shift from the broadcast footprint 614 to the broadcast footprint 612, at the first time, e.g., in response determining that the groups of user devices 604 and/or 606, and/or a portion thereof, are below or at a threshold elevation value.

At a second time, the groups of user devices 604 and 606 may be no longer connected to the base station 602 and/or have left the coverage area, and a group of users 608 is present in the building 610. In such an aspect, at this second time, the elevation for the group of users 608, individually or in aggregate, may be at or above a threshold elevation value. In such an aspect, the base station 602 and/or one or more antenna elements of an associated antenna array may shift broadcast footprints to provide a more vertically oriented beam pattern, e.g., the broadcast footprint 614. In such aspects, the base station 602 and/or one or more antenna elements of an associated antenna array may shift from the broadcast footprint 612 to the broadcast footprint 614.

In various aspects, a horizontally oriented broadcast footprint, e.g., at least partly or substantially similar to the broadcast footprint 612, can be utilized during time periods when user devices are likely out on the street, e.g., in an urban setting, such as during a weekend or outside of normal business hours. In the same or alternative aspects, a vertically oriented broadcast footprint, e.g., at least partly or substantially similar to the broadcast footprint 614, can be utilized during time periods when user devices, or a majority of user devices, are present at elevated positions, e.g., in a building during normal business hours. In certain aspects, the systems and methods disclosed herein can shift between broadcast footprints, e.g., between broadcast footprints 612 and 614, based on contemporaneous elevation information for user devices, as discussed herein. In alternative aspects, the systems and methods disclosed herein can shift between broadcast footprints on a schedule, which may be determined or based on elevation information for user devices over prior time periods and/or historical user elevation information.

It should be understood that the system 600 of FIG. 6 is just one example provided to illustrate various aspects of the methods and systems disclosed herein and that other systems and scenarios are contemplated by the systems and methods disclosed herein.

Figure 7:
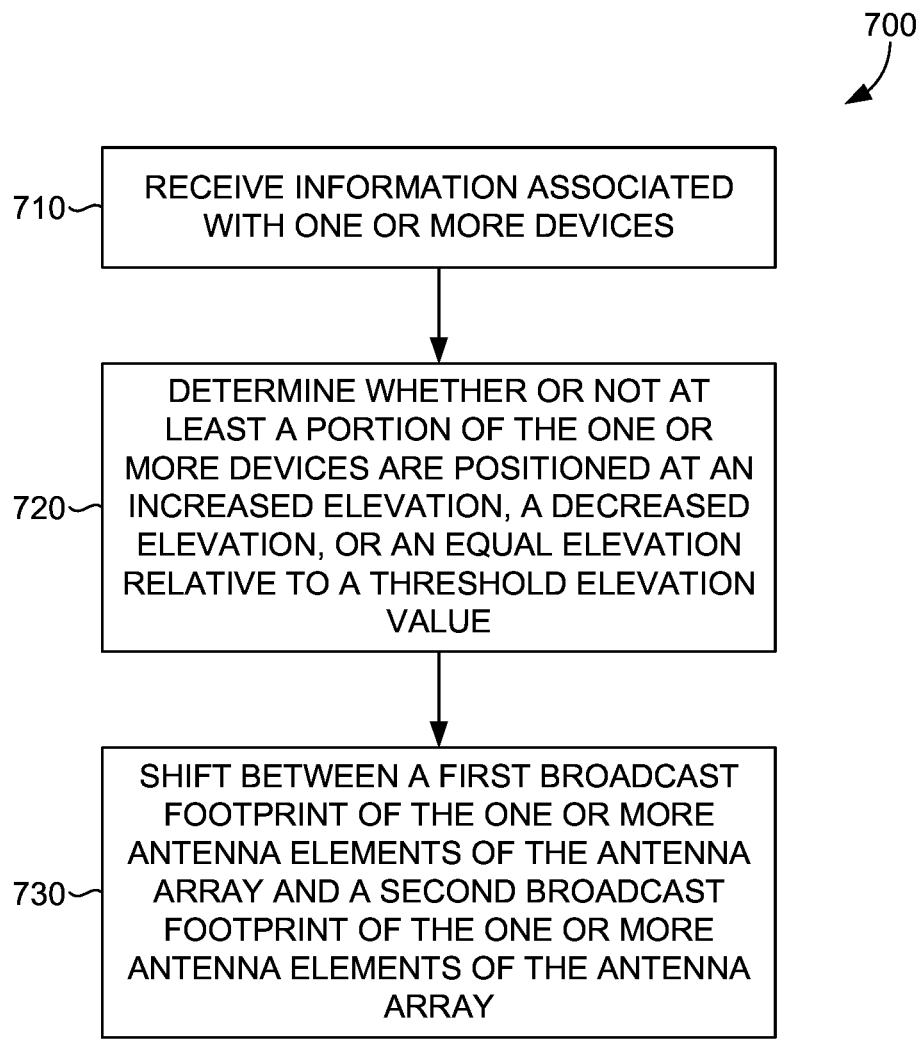
FIG. 7 depicts a flow diagram of an exemplary method for dynamic beam pattern management of one or more antenna elements of an antenna array, in accordance with aspects of the present disclosure.

FIG. 7 is a flow chart of a method 700 for dynamic beam pattern management of one or more antenna elements of an antenna array at a cell site. In aspects, the method 700 can include the step 710 of receiving information associated with one or more devices. In aspects, the information can be received by the receiver 216 of the beam pattern manager 212 of the network environment 200 discussed above with reference to FIG. 2. In various aspects, as discussed above, the information associated with the one or more devices can include elevation information. In certain aspects, as discussed above, the information associated with the one or more devices can include other location information, such as latitude and longitude, GPS, and/or other equivalent information. In one or more aspects, the information associated with the one or more devices can include Minimization of Drive Test (MDT) information, which can include, but is not limited to, elevation and/or AMSL values, latitude values, longitude values, GPS information, velocity information, or a combination thereof.

Step 720 of the method 700 includes determining whether or not at least a portion of one or more devices are position at an increased elevation, a decreased elevation, or an equal elevation relative to a threshold elevation value. In various aspects, the step 720 can be performed by the determiner 218 of the of the beam pattern manager 212 of the network environment 200 discussed above with reference to FIG. 2. In various aspects, the threshold elevation value can include any or all of the properties and parameters discussed above with reference to the determiner 218 of the beam pattern manager 212 of the network environment 200 discussed above with reference to FIG. 2. In certain aspects, in the step 720, the elevation of each user device can be compared to the threshold elevation value and/or an aggregated or calculated elevation value can be obtained for the group of user devices and compared to the threshold elevation value to discern whether or not at least a portion of the user devices are positioned at an increased, elevation, decreased elevation, or equal elevation relative to the threshold elevation value.

In step 730, the method 700 can include shifting between a first broadcast footprint of the one or more antenna elements of an antenna array to a second broadcast footprint of the one or more antenna elements of the antenna array. In aspects, the adjuster 222 of the beam pattern manager 212 of the network environment 200 discussed above with reference to FIG. 2 can perform all or a portion of the step 730. In various aspects, the step 730 occurs based on a determination made in the step 720, e.g., where at least a portion of the one or more devices are positioned above, below, or equal to a threshold elevation value. In various aspects, prior to the shifting between the first and second broadcast footprints, a specific broadcast footprint to switch to can be assigned, e.g., via the assigner 220 of the beam pattern manager 212 of the network environment 200 discussed above with reference to FIG. 2. In various aspects, the first broadcast footprint and the second broadcast footprint are different from one another in an azimuthal plane, e.g., X and Y direction, and in a vertical plane, e.g., in a Z direction. For example, in one aspect, the second broadcast footprint is reduced in an azimuthal plane, e.g., X and Y direction, relative to the first broadcast footprint. In the same or alternative aspects, the second broadcast footprint has an increased footprint in a vertical plane relative to the first broadcast footprint. In various aspects, as discussed above, the step 730 can include switching between a horizontally oriented broadcast footprint, e.g., at least partly or substantially similar to the broadcast footprint 400 of FIGS. 4A and 4B, and a vertically oriented broadcast footprint, e.g., at least partly or substantially similar to the broadcast footprint 500 of FIGS. 5A and 5B.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for dynamic beam pattern management of one or more antenna elements of an antenna array at a cell site, the method comprising:
   receiving information associated with one or more devices over a first time interval, the information comprising elevation information;
   determining, based on the information associated with the one or more devices, whether at least a portion of the one or more devices are positioned at an increased elevation, a decreased elevation, or an equal elevation relative to a threshold elevation value; and
   based on the determining, shifting between a first broadcast footprint of the one or more antenna elements of the antenna array and a second broadcast footprint of the one or more antenna elements of the antenna array, wherein the first and second broadcast footprints are different in an azimuthal plane and in a vertical plane.

2. The method of claim 1, wherein the second broadcast footprint is reduced in the azimuthal plane relative to the first broadcast footprint, and wherein the second broadcast footprint has an increased footprint in the vertical plane relative to the first broadcast footprint.

3. The method of claim 2, wherein the first broadcast footprint extends in the azimuthal plane from about 90° to about −90°, when the one or more antenna elements have an azimuthal position of 0°.

4. The method of claim 3, wherein the second broadcast footprint extends in the azimuthal plane from about 10° to about −10°, when the one or more antenna elements have an azimuthal position of 0°.

5. The method of claim 2, wherein the first broadcast footprint extends in the vertical plane from about 0° to about −25°, when the one or more antenna elements have a vertical position of 0°.

6. The method of claim 5, wherein the second broadcast footprint extends in the vertical plane from about 60° to about −60°, when the one or more antenna elements have a vertical position of 0°.

7. The method of claim 1, wherein the threshold elevation value is determined based on elevation information from devices communicating with the cell site over a second time interval that is prior to the first time interval.

8. The method of claim 7, wherein the threshold elevation value is a median elevation value calculated from the devices communicating with the cell site over the second time interval.

9. The method of claim 2, wherein the determining comprises determining that the at least a portion of the one or more devices is positioned at an increased elevation relative to the threshold elevation value, and wherein the shifting comprises shifting from the first broadcast footprint to the second broadcast footprint.

10. The method of claim 9, wherein the at least the portion of the one or more devices that are positioned at an increased elevation relative to the threshold elevation value comprises at least 20% of the one or more devices.

11. The method of claim 1, wherein the shifting comprises adjusting a power supplied to the one or more antenna elements to shift between the first broadcast footprint and the second broadcast footprint.

12. The method of claim 1, wherein the information received from the one or more devices comprises Minimization of Drive Test (MDT) information.

13. The method of claim 1, wherein the information received from the one or more devices comprises one or more latitude values, one or more longitude values, one or more above mean sea level (AMSL) values, or a combination thereof.

14. The method of claim 1, wherein the one or more antenna elements of the antenna array utilize a 5G wireless communication protocol.

15. A system for dynamic beam pattern management of one or more antenna elements of an antenna array at a cell site, the system comprising:
    an antenna array comprising one or more antenna elements; and
    a processor configured to execute operations comprising:
        receiving information associated with one or more devices over a first time interval, the information comprising elevation information;
        determining, based on the information associated with the one or more devices, whether at least a portion of the one or more devices are positioned at an increased elevation, a decreased elevation, or an equal elevation relative to a threshold elevation value; and
        based on the determining, shifting between a first broadcast footprint of the one or more antenna elements of the antenna array and a second broadcast footprint of the one or more antenna elements of the antenna array, wherein the first and second broadcast footprints are different in an azimuthal plane and in a vertical plane.

16. The system of claim 15, wherein the second broadcast footprint is reduced in the azimuthal plane relative to the first broadcast footprint, and wherein the second broadcast footprint has an increased footprint in a vertical plane relative to the first broadcast footprint.

17. The system of claim 15, wherein the antenna array utilizes a 5G wireless communication protocol.

18. The system of claim 16, wherein the first broadcast footprint extends in the azimuthal plane from about 90° to about −90°, when the one or more antenna elements have an azimuthal position of 0°, and wherein the first broadcast footprint extends in the vertical plane from about 0° to about −25°, when the one or more antenna elements have a vertical position of 0°.

19. The system of claim 16, wherein the second broadcast footprint extends in the azimuthal plane from about 10° to about −10°, when the one or more antenna elements have an azimuthal position of 0°, and wherein the second broadcast footprint extends in the vertical plane from about 60° to about −60°, when the one or more antenna elements have a vertical position of 0°.

20. The system of claim 15, wherein the determining comprises determining that the at least a portion of the one or more devices is positioned at an increased elevation relative to the threshold elevation value, wherein the shifting comprises shifting from the first broadcast footprint to the second broadcast footprint, and wherein the at least the portion of the one or more devices that are positioned at an increased elevation relative to the threshold elevation value comprises at least 20% of the one or more devices.

* * * * *